United States Patent [19]
Dalrymple et al.

[11] Patent Number: 4,942,553
[45] Date of Patent: Jul. 17, 1990

[54] SYSTEM FOR PROVIDING NOTIFICATION OF IMPENDING FIFO OVERRUNS AND UNDERRUNS

[75] Inventors: Monte J. Dalrymple, Fremont; Lois F. Brubaker, Newark, both of Calif.

[73] Assignee: Zilog, Inc., Campbell, Calif.

[21] Appl. No.: 192,946

[22] Filed: May 12, 1988

[51] Int. Cl.⁵ ............................................. G06F 13/38
[52] U.S. Cl. .............................. 364/900; 364/933.6; 364/947.2; 364/957.6; 364/965.4
[58] Field of Search ... 364/200 MS File, 900 MS File

[56] References Cited

U.S. PATENT DOCUMENTS

| | | | |
|---|---|---|---|
| 4,159,532 | 6/1979 | Getson, Jr. et al. | 364/900 |
| 4,228,500 | 10/1980 | Webster | 364/200 |
| 4,254,464 | 3/1981 | Byrne | 364/200 |
| 4,748,588 | 5/1988 | Norman et al. | 364/900 |

OTHER PUBLICATIONS

Benedict, "First-In/First-Out Queue with Program Controlled Directory Search", IBM Tech. Discl. Bull., vol. 17, No. 12, May 1975, pp. 3672-3673.

*Primary Examiner*—Thomas M. Heckler
*Attorney, Agent, or Firm*—Majestic, Parsons, Siebert & Hsue

[57] ABSTRACT

The fill or empty level of a FIFO is detected and compared to a first request level for the direct memory access controller or the coprocessor. When the fill or empty level exceeds the first request level, notification to the DMA or the coprocessor is generated. The fill or empty level is also compared to a second request level and when such level exceeds second request level, notification to the CPU is generated. Thus, in most cases, the DMA or coprocessor is able to obtain control of the bus before the request level for CPU interrupt is reached, thereby preventing wasteful CPU intervention as well as FIFO overruns and underruns. In case the DMA or coprocessor is unable to obtain control of the bus before the request level for CPU interrupt is reached, CPU intervention is available as a last resort.

7 Claims, 8 Drawing Sheets

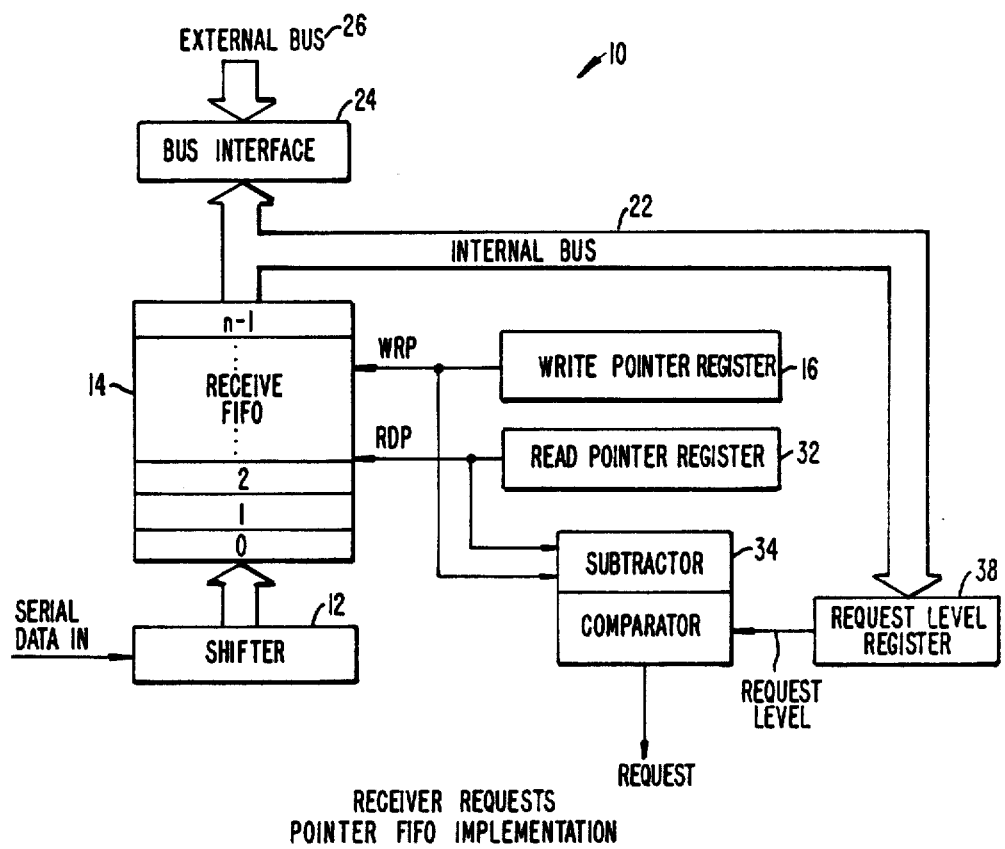
FIG._IA. PRIOR ART
RECEIVER REQUESTS
POINTER FIFO IMPLEMENTATION

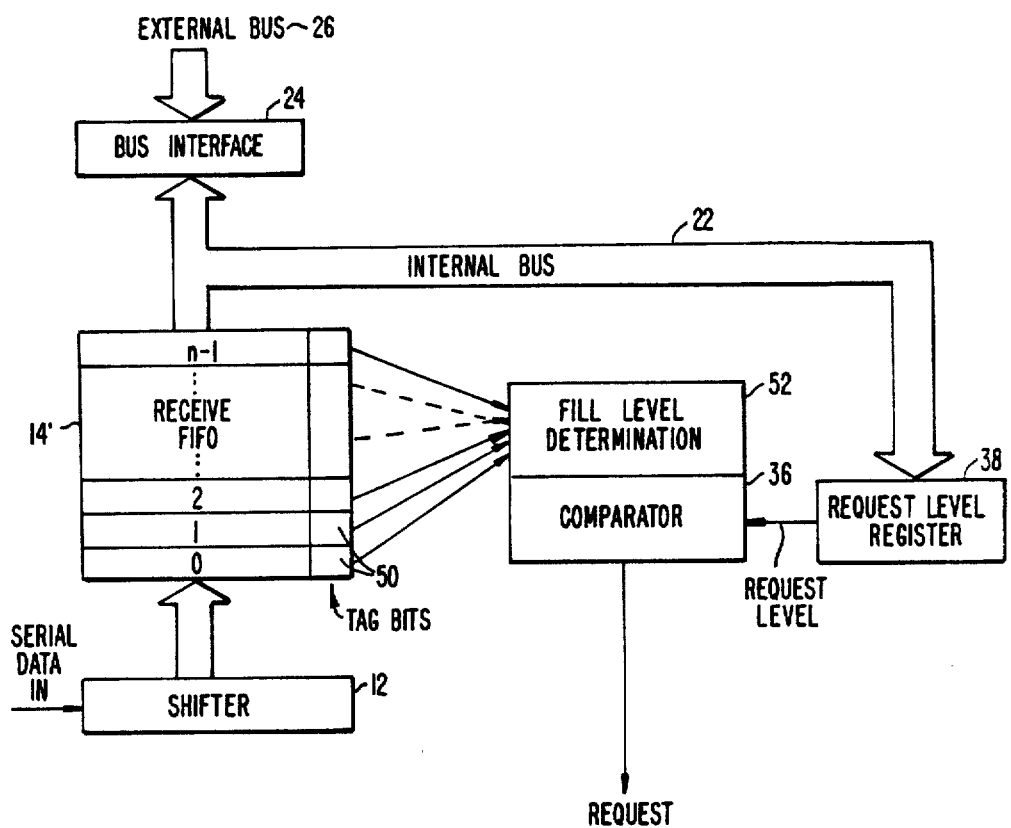
RECEIVER REQUESTS
TAG BIT FIFO IMPLEMENTATION
FIG._IB. PRIOR ART

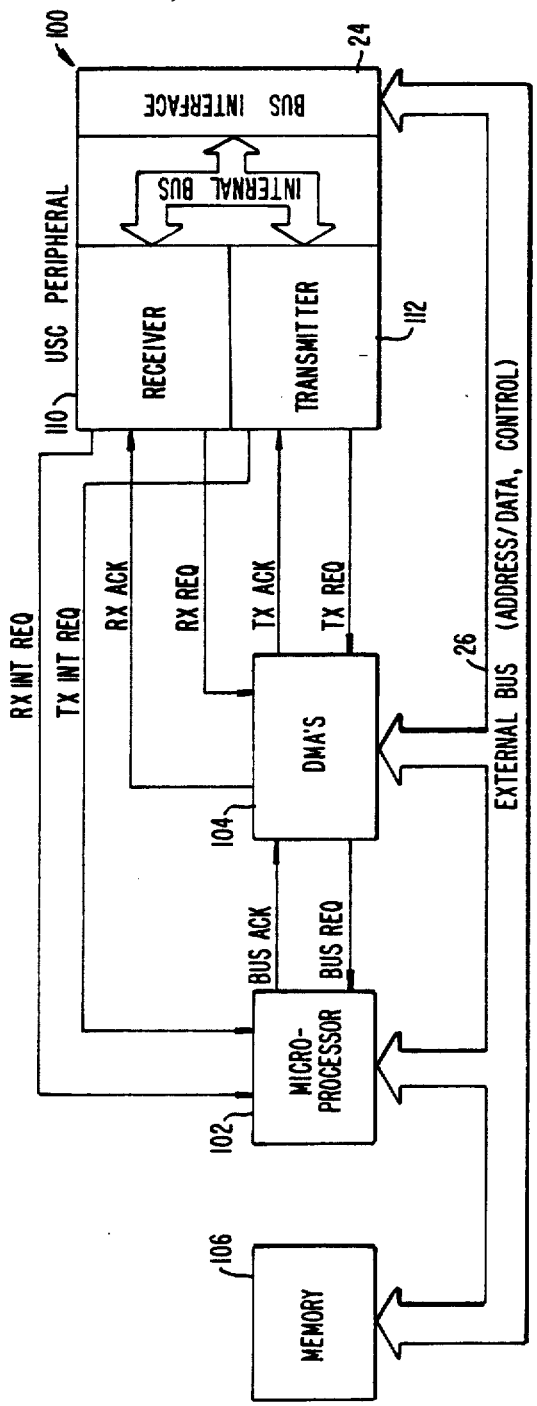
FIG._2.
SYSTEM WITH USC PERIPHERAL

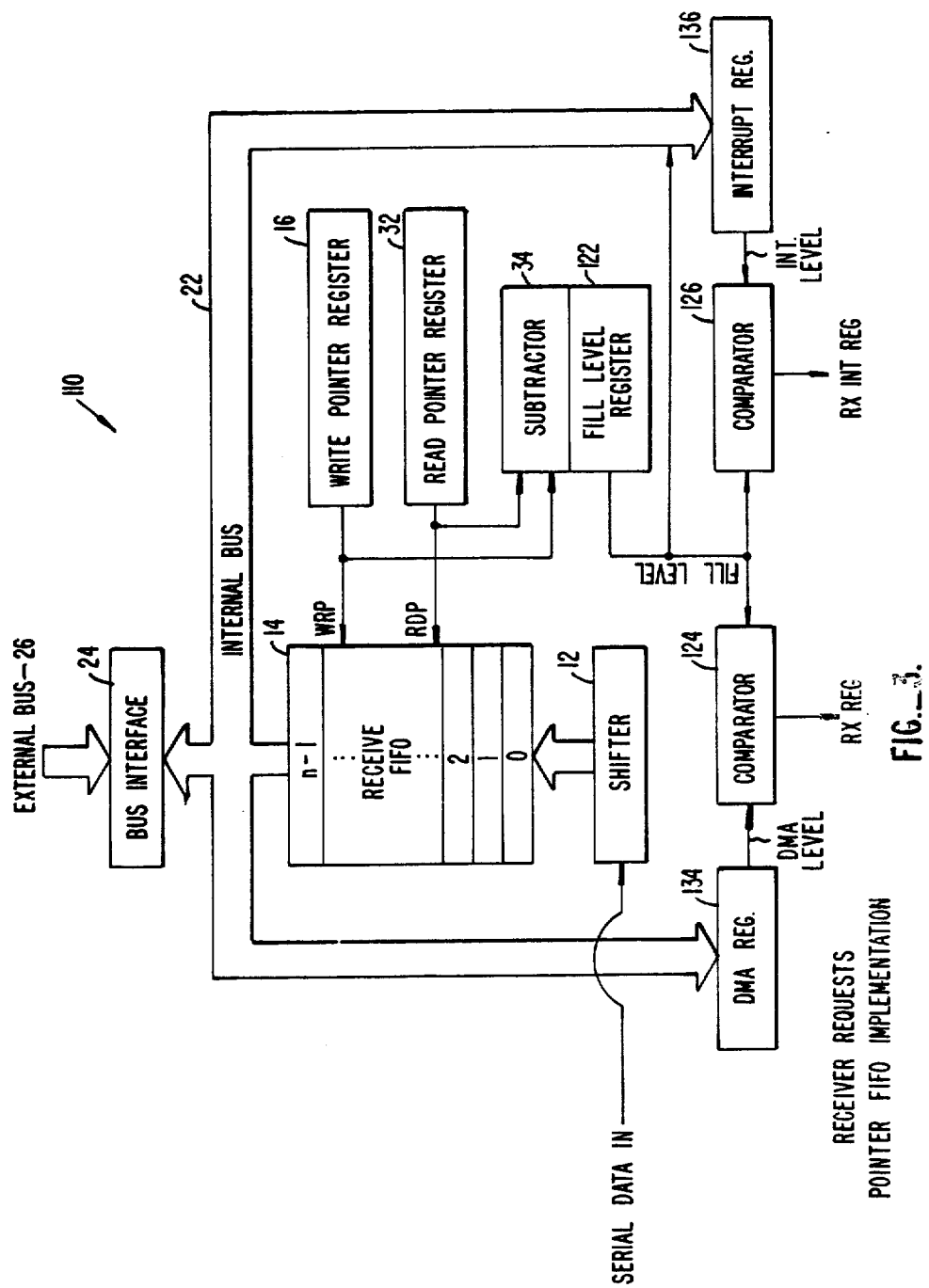

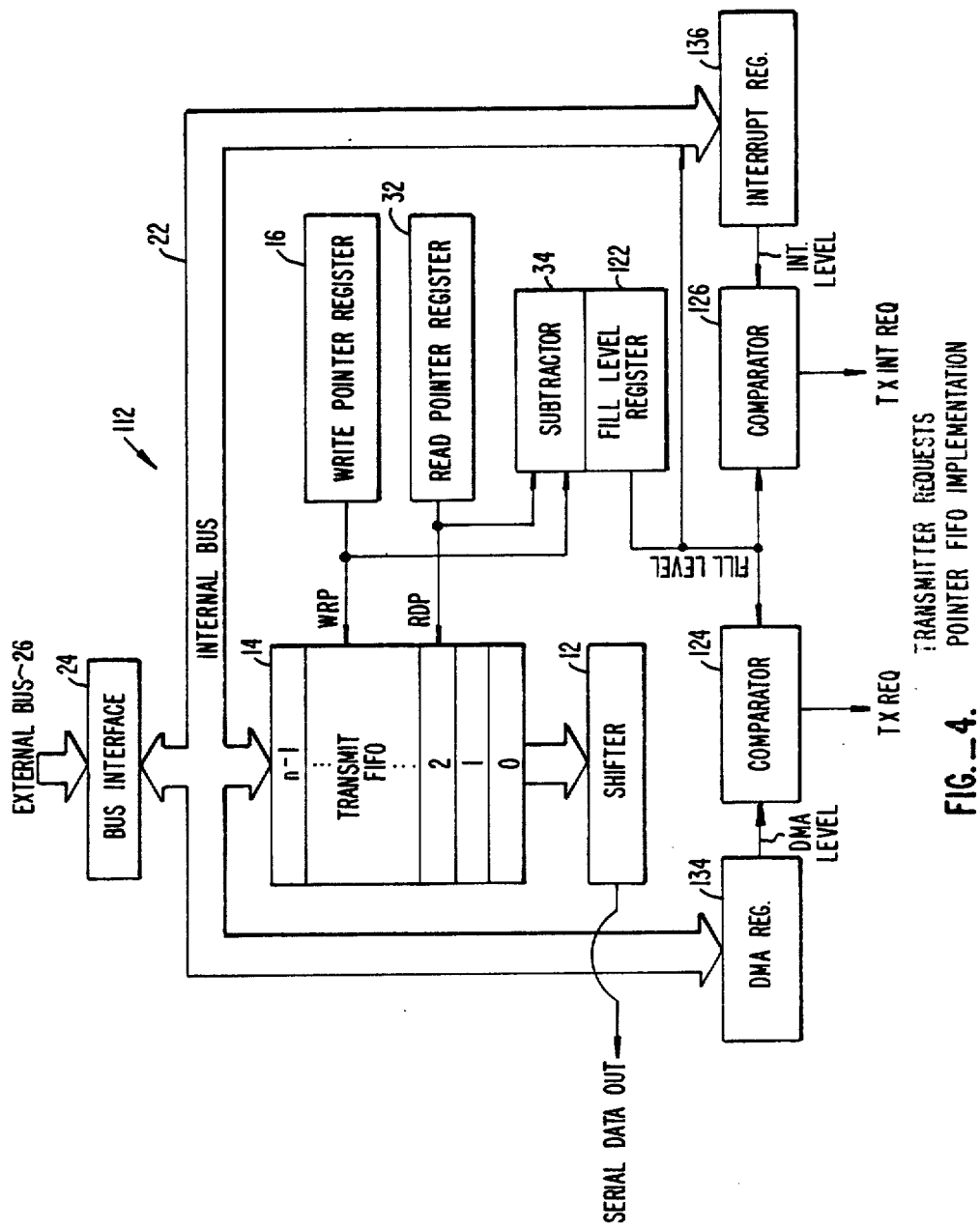
FIG._4. TRANSMITTER REQUESTS POINTER FIFO IMPLEMENTATION

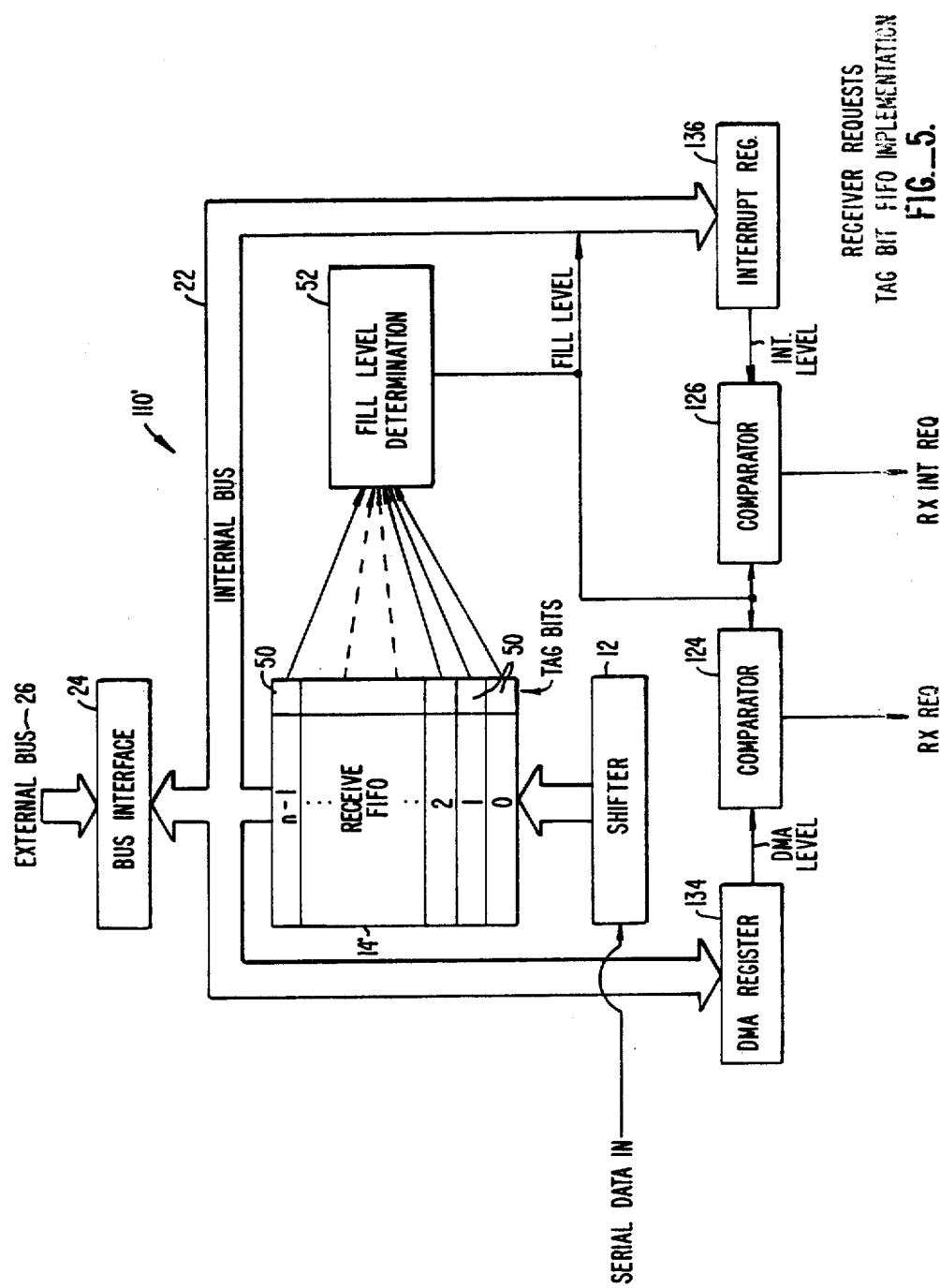
FIG._5.
RECEIVER REQUESTS
TAG BIT FIFO IMPLEMENTATION

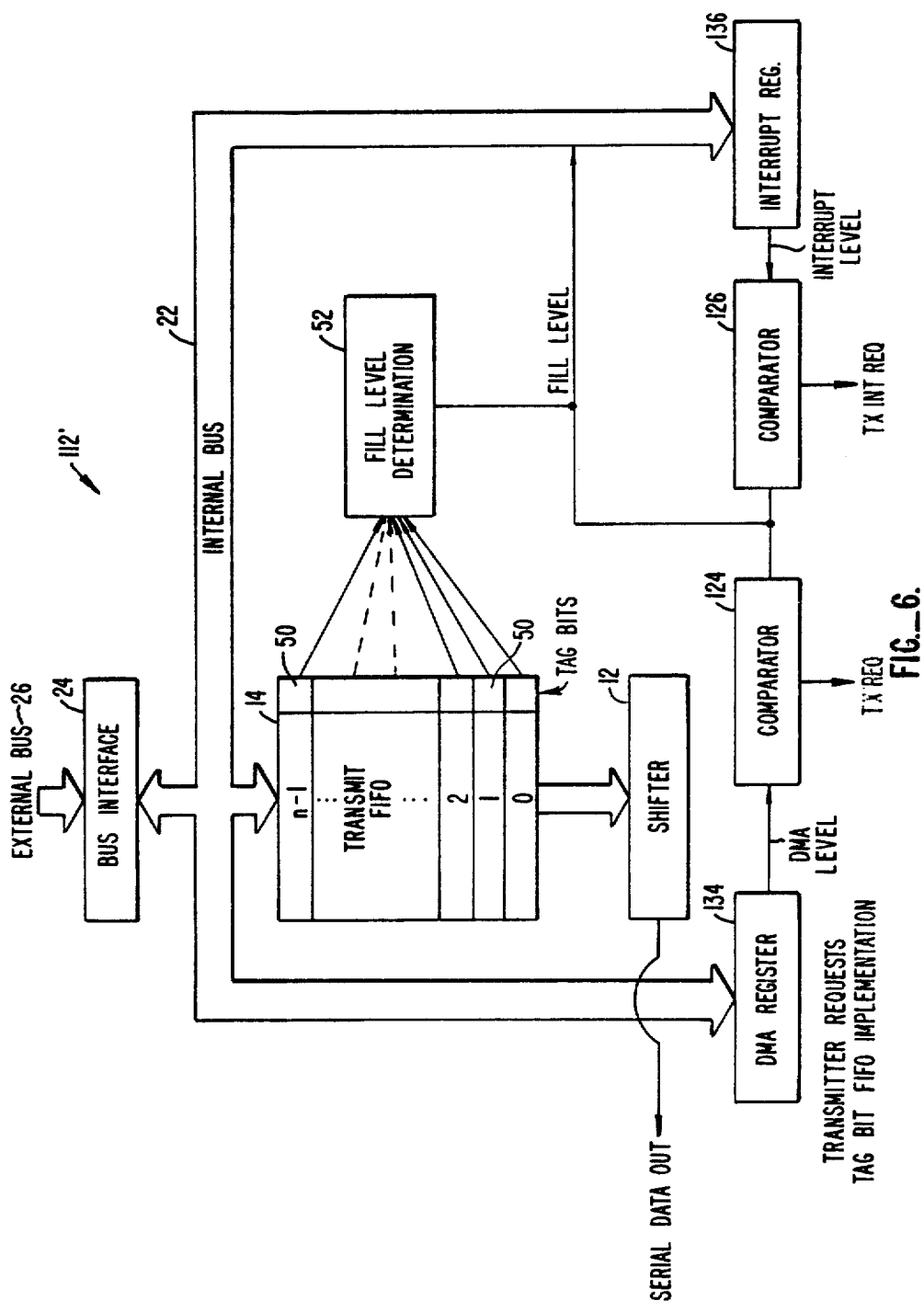
FIG._6.
TRANSMITTER REQUESTS
TAG BIT FIFO IMPLEMENTATION

FIG._8.
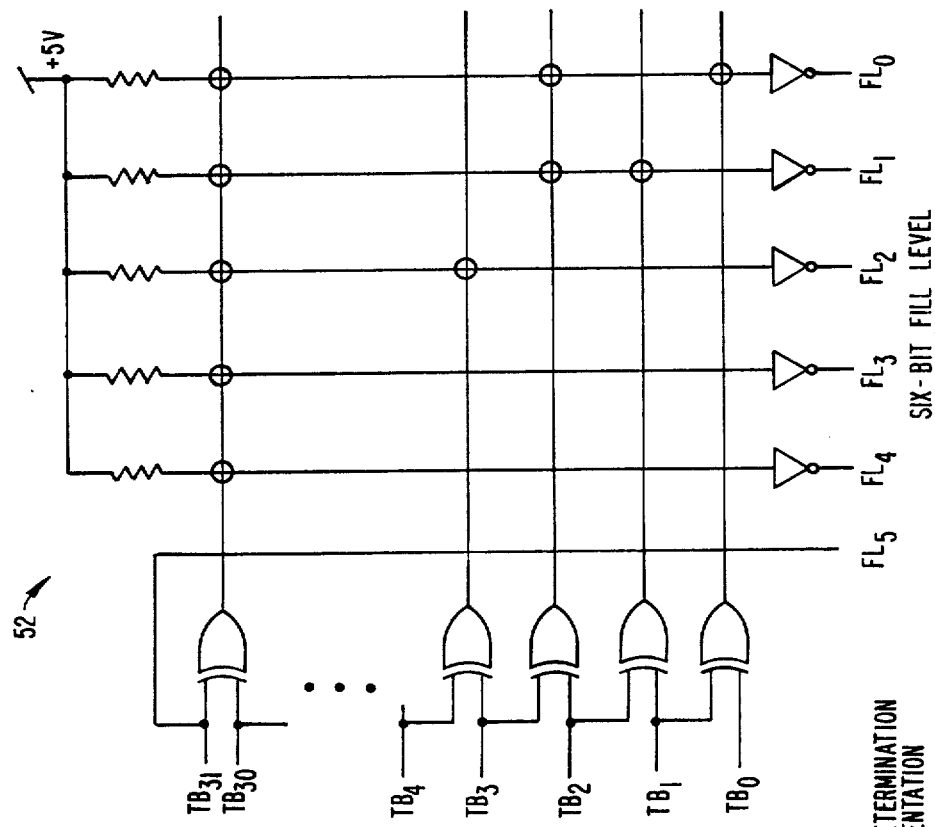
SAMPLE FILL LEVEL DETERMINATION
TAG BIT FIFO IMPLEMENTATION
(32-BYTE FIFO)
FIG._7.

SYSTEM FOR PROVIDING NOTIFICATION OF IMPENDING FIFO OVERRUNS AND UNDERRUNS

BACKGROUND OF THE INVENTION

This invention relates in general to FIFO memory devices and in particular to a system for notifying a microprocessor and a direct memory access controller (DMA) or a co-processor of impending FIFO overruns and underruns so as to prevent these events from occurring.

Peripheral devices such as serializers and disk data controllers used in microprocessor-based systems usually include a FIFO for storing data. When the FIFO is used to store data received from a source outside the system (receive FIFO) so that the data stored may be read into a main memory by a DMA, sometimes FIFO overrun occurs in which the data transferred to the FIFO from the external source exceeds its capacity so that some of the data will be lost. In such event, it is important to detect a condition where impending FIFO overrun is going to occur in order to read some of the stored data into the main memory to make more room for data from the external source. If data is being transmitted from the FIFO to an external source (transmit FIFO) a FIFO underrun can occur where the FIFO runs out of data in which case garbage will be transmitted. In such event, it is desirable to detect the condition of impending FIFO underrun in order to read more data into the FIFO from the main memory.

In conventional devices, a receive or transmit FIFO will provide one notification level. This level is the number of filled (receive FIFO) or empty (transmit FIFO) sites in the FIFO which is the "safe" number before a signal must be sent requiring action from the DMA or the central processing unit in the microprocessor-based system. The conventional peripheral device will initiate either a transfer request to the DMA, or an interrupt request to the central processing unit (CPU) when the filled (receive FIFO) or empty (transmit FIFO) sites in the FIFO exceeds the "safe" number. If the user chooses to send an interrupt request to the CPU, time-wasting intervention by the CPU is required. If the user chooses to initiate a transfer request to the DMA, while CPU intervention is avoided, the DMA may not be able to obtain the bus immediately. If this happens in the case of the receive FIFO, data will continue to arrive at the receive FIFO when the DMA is unable to transfer data out from the FIFO through the bus. A FIFO overrun will occur resulting in lost data. For a transmit FIFO, when the DMA is unable to obtain the bus immediately, the transmit FIFO will continue to transfer data out when the DMA is unable to feed any data into the FIFO. In this situation a FIFO underrun will occur and garbage will be transmitted until the DMA obtains control of the bus. When FIFO overruns or underruns occur, the data transmission process to or from the external source will have to be repeated to assure data accuracy.

Thus, in conventional systems, the user must choose between time-wasting CPU intervention and running the risk of having to repeat data transmissions when FIFO underruns and overruns do occur. One example of a peripheral employing a conventional system for providing notification of impending FIFO overruns and underruns is the DP8466A disk data controller from National Semi-Conductor Corporation of Santa Clara, Calif. It is therefore desirable to provide an improved system for providing notification of impending FIFO overruns and underruns.

SUMMARY OF THE INVENTION

In the conventional system described above, only one request level or "safe" number of filled or empty sites in the FIFO is indicated so that the user must choose between requiring CPU intervention or notifying the DMA. This invention is based on the observation that by using two dedicated and separately enabled request levels, notifications can be sent to both the CPU and the DMA (or co-processor). The request level for the DMA can be set to a lower (receiver) or higher (transmitter) value to allow the DMA more time in obtaining the bus and therefore a value more efficient for data transfer. The request level for a CPU interrupt request can be set to a higher (receiver) or lower (transmitter) value which functions as a backup or safety net. In other words, where the DMA or co-processor is able to obtain control of the bus before the request level for CPU interrupt is reached, wasteful CPU intervention as well as FIFO overruns and underruns are prevented. But CPU intervention can be obtained as a last resort when the DMA cannot obtain control of the bus before the higher CPU interrupt request level is reached. In this manner, the invention facilitates efficient data transfer while reducing the risk of FIFO overruns or underruns.

The apparatus of this invention is for providing notification of impending FIFO overruns and underruns to a CPU and to a DMA or a co-processor. The apparatus comprises means for detecting the fill or empty level of a FIFO and generating an output to indicate the fill or empty level detected, means for comparing the output of the detecting and generating means to a first request level for the DMA or the co-processor and for generating a notification to the DMA or the co-processor when the first request level is exceeded. The apparatus further comprises means for comparing the output of the detecting and generating means to a second request level for the CPU and for generating a notification to the CPU when the second request level is exceeded. In this context, "a request level is exceeded" means that the number of filled sites in the receive FIFO or the number of empty sites in the transmit FIFO exceed the request level. In the preferred embodiment, the first and second request levels are programmable by the user to achieve efficient data transfer.

BRIEF DESCRIPTION OF THE DRAWINGS

FIGS. 1A, 1B are block diagrams of prior art systems of providing notification of impending FIFO overruns and underruns.

FIG. 2 is a block diagram of a microprocessorbased system and a peripheral to illustrate the invention.

FIG. 3 is a block diagram of a receiver device employing a FIFO with pointer implementation to illustrate the preferred embodiment of the invention.

FIG. 4 is a block diagram of a transmitter device employing a FIFO with pointer implementation to illustrate the preferred embodiment of the invention.

FIG. 5 is a block diagram of a receiver employing a FIFO of tag bit implementation to illustrate the invention as applied to a different implementation of the FIFO.

FIG. 6 is a block diagram of a transmitter employing a FIFO of tag bit implementation to illustrate the invention as applied to a FIFO of different implementation.

FIG. 7 is a schematic circuit diagram of fill-level determination of FIGS. 5 and 6.

FIG. 8 is a diagram defining a drawing convention used in FIG. 7.

DETAILED DESCRIPTION OF THE INVENTION

FIG. 1A is a block diagram of a receiver illustrating a conventional system for providing notification of impending FIFO underruns and overruns. As shown in FIG. 1A, receiver 10 comprises a shifter 12 receiving serial data. The serial data written into the shifter is then fed in parallel to FIFO 14. FIFO 14 of FIG. 1A is one of pointer implementation so that the data from the shifter can be written into any one of the n locations (location 0 to location (n−1)) of the FIFO. The location in the FIFO where data is to be written next is kept track of by a write pointer register 16 which stores the location of the FIFO which is next to be written. In many FIFO pointer implementations, the pointers are incremental; in other words, the location next to be written has an address which is greater by one than that of the location last written. Thus if the last location written has the address m where m is less than (n−1) then the address stored in the write pointer register 16 is (m+1). When the (n−1) location is written, the write pointer register returns to the location with the address 0.

Data from FIFO 14 is read through internal bus 22, bus interface 24 and external bus 26 by a DMA (not shown) to a memory (not shown). Similar to the writing process, data from the FIFO can be read from any location of the FIFO where a read pointer register 32 stores the address of the location next to be read. If the write pointer register and the writing process are incremental, the reading process and the read pointer register should also be incremental; or both may be decremental type devices.

The fill level of FIFO 14, or the number of filled locations in the receive FIFO, is then indicated by the difference between the addresses of the write and the read pointer registers and can be obtained by subtracting the two readings by means of subtracter 34. The fill level is compared by means of comparator 36 to a request level from request level register 38. If the fill level exceeds the request level, a request is then sent to either the DMA (or co-processor) or the CPU as an interrupt request, but not both. If the user chooses interrupt request to the CPU to prevent FIFO overruns, this is achieved only at the expense of costly and wasteful CPU intervention. If the user chooses transfer request to the DMA to avoid costly CPU intervention, the user will have to take the risk that the DMA cannot obtain control of the bus in order to read data from the FIFO to make room for more data in time to prevent FIFO overrun. When FIFO overrun occurs, the serial data coming in will be lost. Even if such data can be retransmitted, this is accomplished only at the expense of retransmission. Thus the conventional system of notification forces upon the user a choice between two alternatives, both of which are not satisfactory.

FIG. 1B is a block diagram of a receiver illustrating the prior art system for notification of impending FIFO overruns where the FIFO is implemented by means of tag bits. While there may not be actual prior art systems exactly as shown in FIGS. 1A or 1B, these figures are believed to represent the present state of the art. Identical components in FIGS. 1A, 1B and the remaining figures of the this application are referred to by the same numerals. FIFO 14' of FIG. 1B is different from FIFO 14 of FIG. 1A in that in FIFO 14', the data from the shifter is always written into the same location at the input end of the FIFO and data from the FIFO is always read from the output at the other end of the FIFO, where the data is shifted from the input end to the output end of the FIFO one location at a time. As shown in FIG. 1B, data is always written into the 0 location and read from the (n−1) location. In order to distinguish between locations containing valid data and those that do not, a tag bit 50 is written into location 0 when data from the shifter is written into such location. Such tag bit is then shifted along with the data at the 0 location during subsequent clock cycles until such data reaches the (n−1) location. A fill-level determination circuit 52 reads the tag bits from all n locations to determine the fill level; one implementation of circuit 52 is described below in reference to FIGS. 7 and 8. Similar to the functions described above in reference to FIG. 1A, comparator 36 compares the fill level from circuit 52 to the request level set in register 38. When the fill level exceeds such request level, a request is then sent to either the DMA or the CPU as before.

FIG. 2 is a block diagram of a microprocessor system and a peripheral to illustrate the invention. As shown in FIG. 2, a peripheral 100 is connected to a CPU 102, one or more DMA's 104 and a memory 106 through an external bus 26. The lines for transmitting signals that are important for describing the invention have been shown separately from the external bus. Thus the receiver 110 of the peripheral receives data from an external source (not shown) and stores such data in a receive FIFO (not shown in FIG. 2). DMA 104 causes the data in the receiver FIFO to be read through external bus 26 into memory 106 when the DMA has control of bus 26. Similarly, DMA 104 will control the feeding of data from memory 106 through bus 26 to a transmit FIFO (not shown in FIG. 2) in transmitter 112 when it has control of bus 26.

FIG. 3 is a block diagram of a portion of receiver 110 of FIG. 2 to illustrate the invention where the FIFO is of a pointer implementation. Shifter 12, FIFO 14, registers 16, 32 and subtracter 34 function in the same manner as that described in reference to FIG. 1A above. After the fill level is obtained from subtracter 34, however, the receiver of FIG. 3 differs radically from that of FIG. 1A. The fill level is stored in fill-level register 122 which may simply be a register within the subtracter. The fill level is provided to the internal bus 22 so that it can actually be read from outside the peripheral device. The fill level is provided to two comparators 124, 126. Instead of using only one request level register as in FIG. 1A, two dedicated and separately enabled registers 134, 136 are provided to store two different request levels. For example, when n has the value 32 in FIFO 14 and when the data rate to the FIFO is high, the DMA request level in register 134 may be set to 8 and the interrupt request level in register 136 may be set to 24. Using such sets of request levels for the purpose of illustration, when comparator 124 detects that the fill level has exceeded the DMA request level which is 8, a receive transfer request is sent to the DMA. In reference to FIG. 2, upon receiving such request, DMA 104 sends a request to the CPU 102 for control of bus 26. If CPU 102 determines that such request has a higher priority than other competing tasks requiring the bus, CPU 102 will send a bus acknowledge signal to the DMA acknowledging that the DMA has control of the bus. In such event, DMA 104 will send a receive acknowledge signal to receiver 110 and then start reading data from FIFO 14, thereby causing the address stored in read pointer register 32 to be increased continually. This frees up more space in the FIFO for writing data from shifter 12 and prevents FIFO overruns.

Upon receiving the bus request from the DMA, the CPU 102 may determine that other tasks requiring the bus have higher priorities than the request from the DMA. In such situation, the DMA will have no control of the bus and will not read data from FIFO 14. In the meantime, data from shifter 12 continues to be written into FIFO 14, causing the address in write pointer register 16 to be continually increased. Thus the fill level stored in register 122 continues to increase after it has exceeded the DMA request level of 8. Upon reaching the value set for the interrupt request in register 136, which in this illustration is 24, comparator 126 in receiver 110 sends a receive-interrupt request signal to CPU 102 as shown in FIG. 2. This permits the CPU to intervene in order to prevent FIFO overrun.

By providing two different request levels, one for a data transfer request for the DMA and one for an interrupt request to the CPU, the invention greatly reduces the probability of FIFO overruns in receiver 110. Moreover, costly and wasteful CPU intervention can be avoided in most situations while still being available when necessary. Furthermore the request levels in registers 134 and 136 are programmable by the user in view of the data rate applicable. Thus, at a high data rate where data is written into the FIFO at a high rate, it may be desirable to set low values such as 8 and 24 as indicated above. For low data rates, these values can be increased. In contrast, in prior systems such as the DP8466A disk data controller from National Semi conductor, the single request level can be set to one of only four values, namely, 2, 8, 16 and 24 bytes. Registers 134 and 136 are programmable through external bus 26 and provide much greater flexibility to the user compared to prior systems.

To distinguish between the condition when the FIFO is full compared to the condition when the FIFO is empty, an extra bit is provided in the read and write pointer registers as the most significant bit. Thus when the FIFO is empty, the most significant bit as well as all of the remaining bits of the register are 0. When the FIFO is full, however, the most significant bit of the write pointer register is a 1 while the remaining bits are 0's. Thus before any data is read into the FIFO, all bits of the register 16 are 0's including the most significant bit. Upon completing the first cycle of filling the FIFO 14, the most significant bit in register 16 is a 1 while the remaining bits are 0's. Upon filling the FIFO the second time around, all the bits of register 16 will be 0's. The read pointer register 32 also has an extra most significant bit and functions in the same manner. The subtractor subtracts the most significant bit together with the address in register 32 from the most significant bit plus the address in register 16 and assumes that a carry bit is always available in the subtraction. Such a feature, together with the feature of the most significant bit in registers 16 and 32, assures that the output of subtractor 34 is the correct fill level.

FIG. 4 is a block diagram of a portion of transmitter 112 of FIG. 2 to illustrate the invention. It will be evident that transmitter 112 has essentially the same structure as receiver 110 of FIG. 3 except for several differences. The description of "fill level" in the receiver 110 above is also applicable to the transmitter 112 of FIG. 4, except that, in the case of the transmitter, the "fill level" actually means the number of empty locations in the FIFO. By such definition, the structure of the transmitter and receiver can be made very similar to facilitate manufacturing. Instead of receiving data, data in FIFO 14 is written into shifter 12 whose serial data output is transmitted to a source which is not shown. FIFO 14 receives data through the external bus from memory 106 as controlled by DMA 104 in reference to FIG. 2. The write and read pointer registers, subtractor, fill-level register, comparators and the DMA register and interrupt register function in the same manner as those in receiver 110 of FIG. 3, except that to compute the fill level as the number of empty locations, the subtractor subtracts the most significant bit together with the address in the write pointer register from those in the read pointer register.

When comparator 124 detects that the empty level (number of empty locations) has exceeded the DMA request level, a data transmit request is sent to the DMA requesting more data to be transferred from memory 106. The DMA sends a bus request to CPU 102. As before, if CPU 102 acknowledges that the DMA has control of the bus, the DMA will send a transmit acknowledge signal to transmitter 112 and start transmitting data to FIFO 14. If CPU 102 does not turn over control of the bus to the DMA, the empty level will continue to increase until comparator 126 sends an interrupt request to CPU 102 so that the CPU can intervene and prevent FIFO underrun. Again the probability of FIFO underruns is greatly reduced; costly CPU intervention is avoided in most situations while still being available when necessary. The DMA and interrupt request levels are programmable by the user as before to values most efficient for data transfer and to provide an adequate safety net.

FIG. 5 is a block diagram of receiver 110' which illustrates the invention where the FIFO is one of tag bit implementation. In reference to FIGS. 1B and 5, FIFO 14', tag bits 50 and fill level determination circuit 52 of FIG. 5 function in the same manner as those in FIG. 1B. Comparators 124, 126 and registers 134, 136 of FIG. 5 function in the same manner as that described above in reference to FIG. 3. Thus circuit 52 detects the tag bits of all n locations of FIFO 14' to determine the fill level. The fill level is then supplied to comparators 124 and 126 as in FIG. 3 for generating the DMA and interrupt requests when necessary as before.

In one implementation of FIFO 14', when data is written into location 0, a tag bit 1 is written along with it while the tag bits for the remaining empty locations are all 0's. When data is continually written from shifter 12 into FIFO 14', the boundary between the tag bit 1 and the next higher tag bit 0 is also shifted upwards.

FIG. 7 is a schematic circuit diagram of circuit 52 to illustrate the operation of receiver 110' of FIG. 5, where the FIFO 14' is assumed to have a capacity of 32 bytes. As shown in FIG. 7, the tag bits of any two adjacent locations in the FIFO are supplied to the inputs of an exclusive OR-gate. The outputs of the exclusive OR-gates are connected with selective lines of five nodes whose top ends are tied through resistors to a 5-volt rail and whose bottom ends, after being inverted, form the five least significant bits of the fill level ($FL_0$ to $FL_4$). The outputs of the exclusive OR-gates are connected to selective ones of the five lines through pull down transistors illustrated in FIG. 8 in a pattern that, with the tag bit of location 31, yields the correct fill level from 0 to 32. Thus the output of the exclusive OR-gate for the two lowest order tag bits $TB_0$, $TB_1$ is connected to the line yielding the least significant bit $FL_0$. Thus if $TB_0$ is 1 and $TB_1$ through $TB_{31}$ are 0's, then $FL_0$ will be 1 and $FL_1$ through $FL_4$ will be 0's. If $TB_1$ is also a 1 and $TB_2$ through $TB_{31}$ are 0's, then $FL_1$ will be a 1 and $FL_0$, $FL_2$ through $FL_4$ will be 0's, since the $FL_0$ will turn from 1 to 0 once $TB_1$ changes from 0 to 1 due to the 5-volt rail voltage. In such manner, the circuit of FIG. 7 detects the boundary between the group of tag bits of the value 0 and the group of the value 1 to indicate the correct fill level.

FIG. 6 is a block diagram of transmitter 112' illustrating an alternative embodiment of the invention where the FIFO is one of tag bit implementation. The structure of transmitter 112' is similar to that of receiver 110'; the differences between the two are the same as those between receiver 110 and transmitter 112 of FIG. 3 and 4.

While FIFO 14 and pointer registers 16, 32 are described as incremental systems where the location written or read has an address one higher than the one previously written or read, it will be understood that a decremental system may also be used where the location written or read has an address which is one less than that of the one previously written or read. While FIGS. 7 and 8 illustrate one implementation of the fill-level determination circuit, other implementations are possible. The invention has been described as providing notification to a CPU and a DMA; it will be understood that the invention is equally applicable where notification is supplied to the CPU and a co-processor instead of a DMA used to control data flow between the FIFO and a system memory through the external bus as well. All such variations are within the scope of the invention. Other variations and the details of the structure and implementation may also be within the scope of the appended claims.

We claim:

1. An apparatus for providing notification of impending FIFO overruns and underruns to a direct memory access controller or a co-processor having a predetermined first request level and to a microprocessor having a predetermined second request level, comprising:
    means for detecting the fill or empty level of a FIFO and generating an output to indicate the fill or empty level detected;
    means for comparing the output of the detecting and generating means to the first request level and for generating a notification to the direct memory access controller or the co-processor when the first request level is exceeded; and
    means for comparing the output of the detecting and generating means to the sound request level and for generating a notification to the microprocessor when the second request level is exceeded by the fill or empty level.

2. The apparatus of claim 1, wherein the first and second request levels are programmable.

3. The apparatus of claim 1, wherein the FIFO is of a type where data is written into or read from the location immediately adjacent to the one previously written or read, said detecting and generating means comprises:
    a write pointer register for storing the location in the FIFO which is next to be written;
    a read pointer register for storing the location in the FIFO which is next to be read; and
    means for subtracting the addresses of the two registers to provide the fill or empty level.

4. The apparatus of claim 3, wherein the write pointer register and read pointer register are incremental.

5. The apparatus of claim 1, wherein the FIFO is of a type where data is always written into the location immediately adjacent to the input and read from the location furthest away from the input, wherein a tag bit is written into each location when data is written into such location, the data at such location and its tag bit being shifted away from the input towards the location furthest away from the input, and wherein the detecting and generating means reads the tag bits of all the locations of the FIFO to generate an output indicative of the fill level.

6. The apparatus of claim 1, wherein the output of the detecting and generating means is provided to a bus for the microprocessor and the direct memory access controller or co-processor so that the fill or empty level can be read.

7. A method for providing notification of impending FIFO overruns and underruns to a direct memory access controller or a co-processor having a predetermined first request level and to a microprocessor having a predetermined second request level, comprising:
    detecting the fill or empty level of a FIFO;
    comparing the fill or empty level to the first request level and for generating a notification to the direct memory access controller or the co-processor when the first request level is exceeded; and
    comparing the fill or empty level to the second request level for the microprocessor and for generating a notification to the microprocessor when the second request level is exceeded by the fill or empty level.

* * * * *

UNITED STATES PATENT AND TRADEMARK OFFICE
CERTIFICATE OF CORRECTION

PATENT NO. : 4,942,553
DATED : JULY 17, 1990
INVENTOR(S) : DALRYMPLE et al

It is certified that error appears in the above-identified patent and that said Letters Patent is hereby corrected as shown below:

Column 8, line 5, in Claim 1: replace "sound" with --second--

Signed and Sealed this

First Day of October, 1991

Attest:

HARRY F. MANBECK, JR.

Attesting Officer

Commissioner of Patents and Trademarks